United States Patent [19]

Easton

[11] Patent Number: 5,421,451
[45] Date of Patent: Jun. 6, 1995

[54] CONVEYOR CONSTRUCTION

[75] Inventor: Richard L. Easton, St. Peters, Mo.

[73] Assignee: Alvey, Inc., St. Louis, Mo.

[21] Appl. No.: 204,738

[22] Filed: Mar. 2, 1994

[51] Int. Cl.6 ............................................. B65G 21/00
[52] U.S. Cl. ................................ 198/860.1; 198/861.1; 411/400
[58] Field of Search ................. 198/780, 860.1, 861.1; 193/35 R; 411/400, 401, 409; 211/186; 403/258, 259, 260

[56] References Cited

U.S. PATENT DOCUMENTS

| | | | |
|---|---|---|---|
| 2,379,752 | 7/1945 | Schultz | 411/401 |
| 2,801,730 | 8/1957 | Strickler | 193/35 R |
| 3,075,622 | 1/1963 | Attwood | 411/400 X |
| 3,303,735 | 2/1967 | Fisher | 411/400 |
| 4,372,522 | 2/1983 | Simeonoff | 211/186 |
| 4,930,623 | 6/1990 | Johnson et al. | 198/860.1 X |

Primary Examiner—Cheryl L. Gastineau
Attorney, Agent, or Firm—Varnum, Riddering, Schmidt & Howlett

[57] ABSTRACT

A conveyor comprises parallel side frames provided with a plurality of apertures and C-shaped cross members provided with apertures in the side walls disposed in juxtaposition to apertures in the side frames. The cross member apertures are each defined by a flat inner wall. The cross members are fastened to the side frames by hook-bolts having a hook portion extending through the side wall apertures and a shaft extending to a juxtaposed aperture in the side frame and provided with a nut and washer to secure the bolt in the side frame. The hook portion of the bolt is provided with a flat surface extending a substantial distance across the inner surface of the hook portion of the bolt to provide a load bearing contact area with the inner wall of the side member aperture. The cross members have tabs extending outwardly from each end which are inserted into complementary apertures in the side frames. The resulting bolted conveyor frame construction ensures frame alignment under heavy loads.

8 Claims, 2 Drawing Sheets

CONVEYOR CONSTRUCTION

BACKGROUND OF THE INVENTION

1. Field of the Invention

This invention relates to conveyors for material handling applications and more specifically to conveyor support frame construction.

2. Description of the Related Art

Various different types of conveyor systems are used to transport various types of materials between designated locations. The typical conveyor includes a conveyor medium such as rollers, belt or continuous chain movably supported on a support frame and driven by a suitable power source. The conveyor support frame typically includes parallel side frames and cross members interconnecting the side frames to support rollers or other conveying medium. A design problem common to conveyor frame construction is the need to keep the frame properly aligned, by keeping the side frames in a fixed relation to each other, in the presence of missaligning forces generated by movement of the conveyor medium under load. Misalignment causes excessive wear of the conveyor components, such wear is expensive not only in the cost of the components but also in conveyor down time required to replace the components. Furthermore, lack of proper alignment may cause materials transported by the conveyor to be misdirected or damaged.

It will be apparent that conveyor frame construction will differ between conveyors carrying heavy loads and those carrying light loads. In warehousing operations smaller, lighter weight conveyors are typically used only to transport units typically weighing less than 100 pounds each, while larger conveyors are used to transport large pallets weighing several thousands of pounds. Maintaining proper alignment is much more of a problem in the larger conveyors because of the heavier loads and typically, the greater spacing between the conveyor side walls. Prior art lightweight conveyors may employ tie rods or tubes as cross members, bolted to the side frames. Standard J-bolts or hook-bolts, having a hook portion forming more nearly an acute angle with the shaft portion than a typical J-bolt, have been used to connect cross members to the side frames of lightweight conveyors. Heavy conveyors, such as those used to transport loaded pallets, typically employ a welded construction in which cross members are welded to the side frames to ensure continued alignment of the conveyor frame during use. A serious disadvantage of welded conveyor frame construction, however, is that the conveyor support frame must be welded in a conveyor assembly area and thereafter painted in a separate paint area and must then be returned to the assembly area for further assembly. This additional handling is labor intensive and adds significantly to the cost of the conveyor. Bolted construction conveyor frames have a significant advantage in that the conveyor side walls and cross members may be individually painted as component parts and the complete conveyor can be assembled from the component parts all in one assembly area.

SUMMARY OF THE INVENTION

These and other problems of the prior art are overcome in accordance with this invention by a bolted conveyor construction employing hook-bolts having a flat inner surface for seating on flat inner walls in apertures in the cross members. Advantageously, the construction in accordance with this invention provides surface contact between the flat surface of the hook bolts and the flat walls of the apertures of the cross members instead of point contact normally encountered between a J-bolt or hook-bolt and the wall aperture. The flat surface contact avoids the rotational movement which tends to occur when a standard rounded J-bolt or hook bolt is inserted in an aperture. Furthermore, the load bearing surface between the hook bolt having a flat wall and the flat surface of a cross member aperture is increased, allowing greater loads to be applied without substantial deformation of the bolt or the aperture wall thereby reducing the chances of a loosening of the connection under load stress.

The cross members are preferably channel shaped members having opposite side walls and the apertures are preferably located in the side walls. In that position, the connecting bolts are at the points of greatest stress since significant forces are set up in the conveyor frame tending to turn the cross members relative to the side frames, thereby overcoming a weakness of the prior art bolted construction in which end flanges of the cross members are bolted to the conveyor side walls. The channel cross members may be provided with end tabs extending into corresponding openings in the conveyor side frames for proper location of the cross member.

The hook bolt is preferably formed such that one edge of the flat surface is in close proximity to the shaft of the hook bolt, thereby providing a more direct transfer of force from the cross member to the shaft of the hook-bolt as missaligning forces are applied to the support frame. Advantageously, a significant cost savings is obtained by the bolted construction over the predominantly used welded construction, and the hook-bolt in accordance with this invention provides an attachment of the cross members and the side frame comparable to welded construction in resistance to missaligning forces.

BRIEF DESCRIPTION OF THE DRAWING

The invention is described below with reference to the accompanying drawing in which.

DETAILED DESCRIPTION

Figure 1:
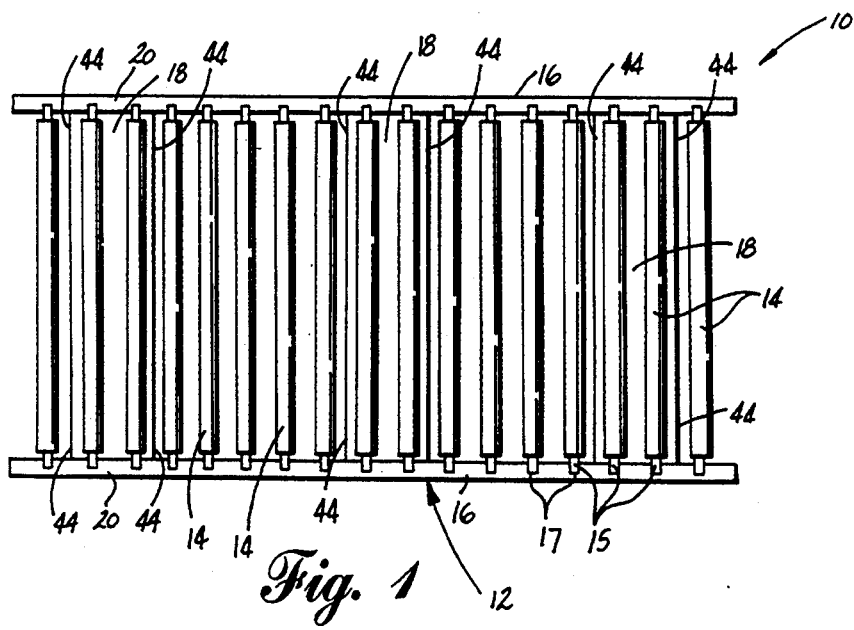
FIG. 1 is a plan view of a roller conveyor incorporating the principles of the invention.
Figure 2:
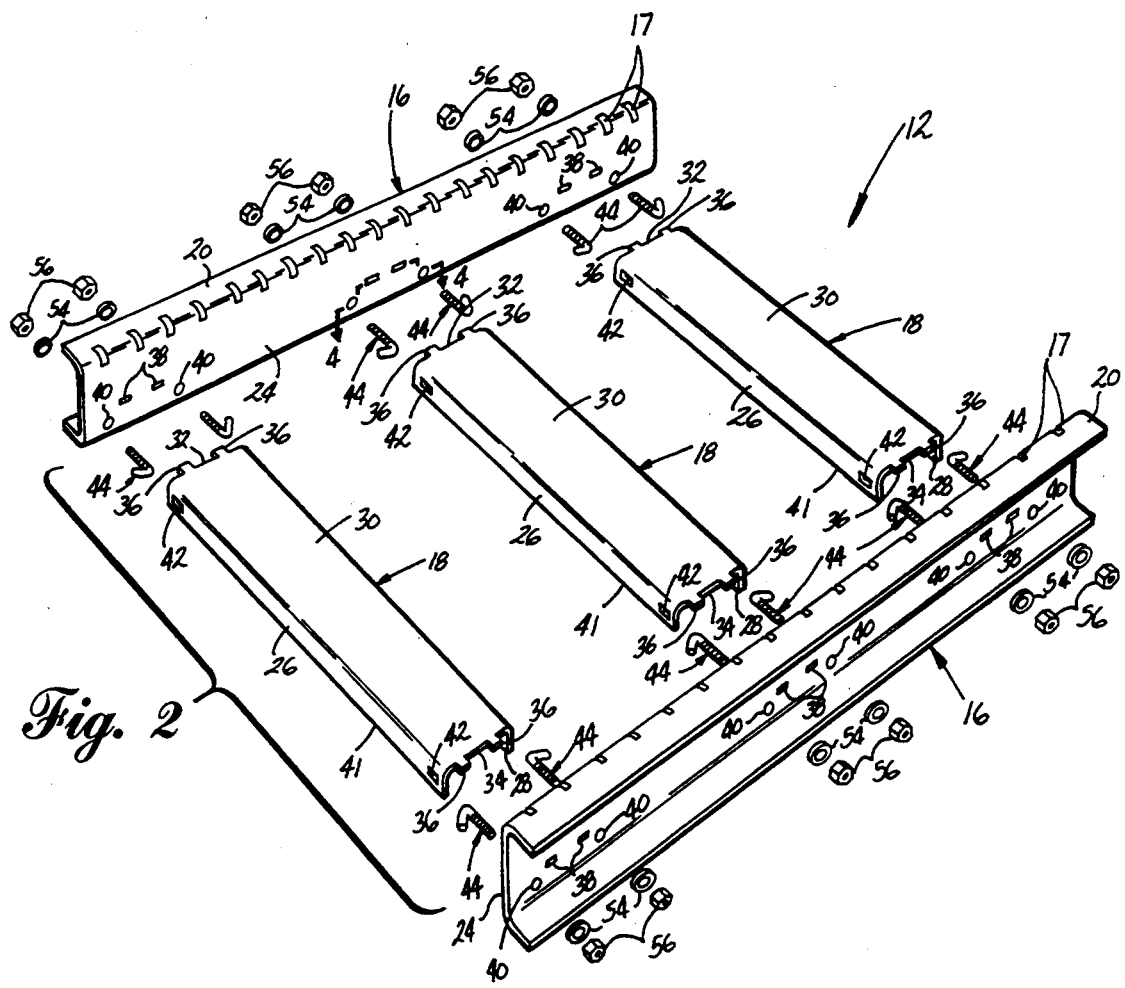
FIG. 2 is an exploded view of the frame of the conveyor of FIG. 1.

FIG. 1 shows a roller conveyor 10 comprising a conveyor frame 12 to which a plurality of rollers 14 is rotatably mounted. The rollers have axles 15 at each end which are supported in slots 17 in the conveyor frame 12. The rollers 14 may be powered by conventional power means (not shown in the drawing) in a manner well-known in the art, to move articles placed on the roller conveyor 10 in the direction of rotation of the rollers 14. The conveyor frame 12 comprises opposing parallel side frames 16 and a plurality of cross members 18 fastened to the side frames by means of hook-bolts 44. A roller conveyor such as shown in FIG. 1 may take on various dimensions depending upon the use of the conveyor, by way of example, a conveyor for transporting loaded pallets may be on the order to four feet wide and may be constructed of interconnected sections on the order of ten feet in length.

Figure 4:
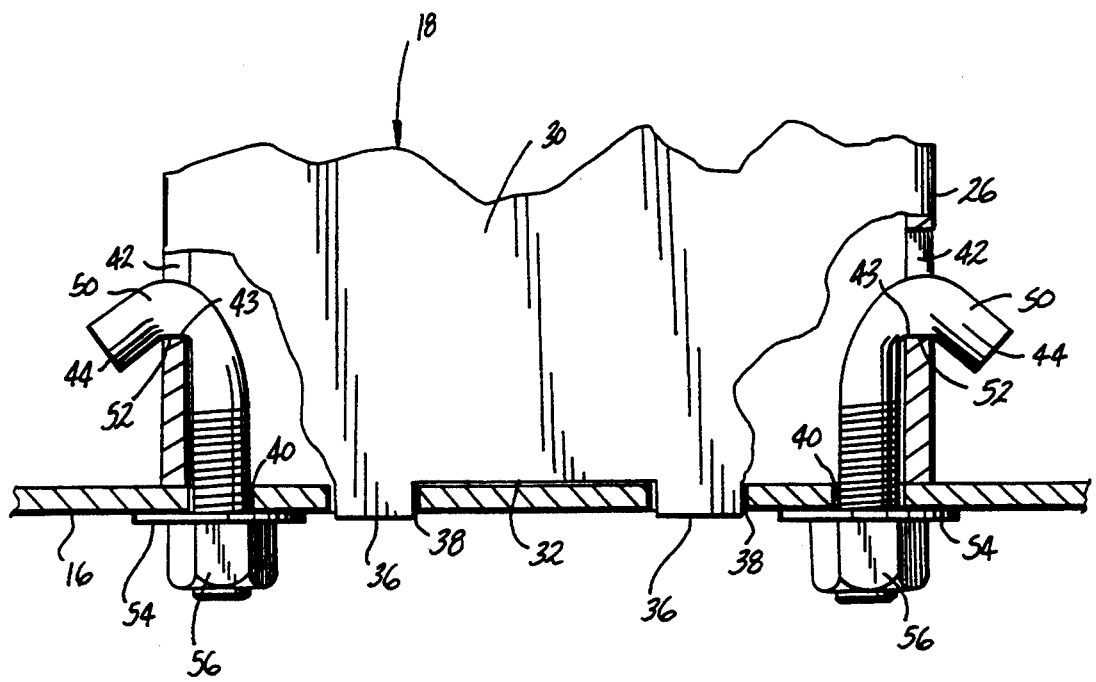
FIG. 4 is a partial sectional view along line 4—4 of FIG. 2 with the conveyor frame assembled.

The construction of the conveyor frame 12 may best be seen in FIGS. 1 and 4. In the present embodiment of the invention, the parallel side frame 16 are generally C-shaped in cross section and comprise opposing top and bottom walls 20, 22 respectively, connected by side wall 24. The side wall 24 of each frame 16 has, disposed in spaced relationship along its length, several pairs of elongated tab apertures 38. Disposed below each pair of tab apertures 38 is a pair of bolt apertures 40.

The cross members 18 are generally C-shaped in cross section and comprise opposing side walls 26, 28 connected by upper wall 30. The cross members further have opposite first and second ends 32, 34, from which extend spaces tabs 36. The tabs 36 are inserted in the slots 38 in the side frame 16 when the frame is assembled. Together the tabs and slots serve to define the proper location of the cross members in the side frames and prevent vertical and lateral movement of the cross members. The cross members 18 further comprise opposed, rectangular hook apertures 42, each defined by a flat inner wall 43 as shown in FIG. 4. The hook apertures are disposed in the side walls 26, 28 of the cross members 18 adjacent the first and second ends 32, 34. Hook-bolts 44 have a hook portion inserted in the hook apertures 42 of the cross members and a threaded shaft extended through the bolt apertures 40 in the side frames 16. Hex nuts 56, together with washers 54, are threaded onto the hook-bolts 44 to draw the frame together. The hook apertures 42 are preferably in the side walls 26, 28 rather than in the upper wall 30 to counteract a lateral twisting moment exerted on the cross members 18.

Figure 3:
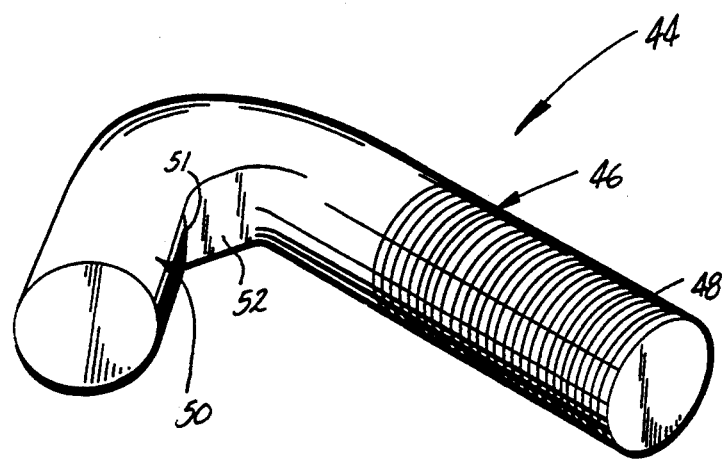
FIG. 3 is a perspective view of a hook-bolt used in the conveyor frame of FIGS. 1 and 2.

FIG. 3 shows the hook-bolt 44 having a shaft 46 provided with a threaded end 48 and a hook portion 50. The hook-bolt 44 is of substantially the same diameter in the shaft and the hook portion. The hook portion 50 has an inner surface 51 and a flat area 52 formed on the inner surface 51. The flat area 52 is designed to abut the inner wall 43 of the hook aperture 42. As can be seen in FIG. 3, the flat area 52 extends a substantial distance across the diameter of the hook-bolt 44. Preferably, the flat area has a cross dimension somewhat greater than or equal to the width of the hook aperture inner wall 43, corresponding to the thickness of the side walls 26, 28, to ensure proper seating of the flat area 52 on the inner wall 43. Typically, the flat area 52 will have a cross dimension of 3/16ths to ¼ inch in a bolt having a diameter of ½ inch. Thus, the ratio of the diameter of the bolt to the flat area is on the order to two to one.

The interrelation of the side frames 16, cross members 18 and hook-bolts 44 is further illustrated in FIG. 4. To assemble the roller conveyor 12, the side frames are aligned in a parallel relationship and the cross members 18 are attached to the side frames by hook-bolts 44. The cross members 18 are mounted to the side frames 16 by inserting the tabs 36 into tab apertures 38 of the side frames 16 to assure proper location of the cross members 18. The hook portion 50 of the hook-bolts 44 are inserted into hook apertures 42 of each of the cross members 18 and the shafts 46 are inserted into the bolt apertures 40 of the side frames 16. Washers 54 are placed on the stems 46 and nuts 56 are threaded onto the threaded ends 48 and tightened. As the nuts 56 are tightened, the hook-bolts 44 are drawn toward the side walls 24 of the frames 16, causing the flat areas 52 to be snugly seated against the flat sidewalls 43 of the hook apertures 42 to clamp the cross members 18 to the side frame 16.

The flat surface of the hook-bolts 44 engaging the flat walls 43 keeps the cross members 18 in a fixed relationship with respect to the side frames 16. The flat area 52 prevents the hook-bolts 44 from turning during and after assembly. Furthermore, the flat contact area between the bolt 44 and the hook aperture 42 allows a greater force to be applied to the bolt without the substantial deformation of the bolt or the aperture. As a result, any significant play between the side frame 16 and the cross members 18 is eliminated to keep the cross members in a perpendicular relationship with respect to the side frames to maintain the frame 12 in proper alignment.

Reasonably variations or modifications may be made without departing from the spirit and scope of the invention as defined in the accompanying claims.

What is claimed is:

1. A conveyor frame comprising:
   opposing side frames, each having a plurality of side frame apertures;
   a plurality of cross members disposed between the opposing side frames and each having a cross member aperture defined by a flat inner wall and spaced juxtaposition to one of the side frame apertures;
   a bolt comprising a shaft and a hook portion having an inner surface and a flat surface area extending a substantial distance across the inner surface, the hook portion mounted in one of the cross member apertures such that the flat surface of the hook portion is seated on the flat inner wall of the one of the cross member apertures;
   the shaft extending through a juxtaposed one of the side frame apertures; and
   a fastener mounted on the shaft to draw the side member and the cross member in an abutting relationship to clamp the cross member to the side member.

2. The conveyor frame according to claim 1 wherein the cross members have a generally C-shaped cross section having opposing side walls and wherein the one cross member aperture is disposed in one of the opposing side walls of one of the cross members.

3. The conveyor frame according to claim 2 wherein the side frames each comprise tab apertures and the cross members have opposing ends and tabs extending from the opposing ends and engaging the tab apertures.

4. The conveyor frame according to claim 2 wherein the inner wall has a predefined width and wherein the flat surface on the hook portion has a cross dimension greater than or equal to the width of the inner wall.

5. The conveyor frame according to claim 4 wherein the bolt has a predefined diameter and the flat surface has a cross dimension substantially equal to ½ of the diameter to the bolt.

6. The conveyor frame according to claim 4 wherein each end of each of the cross members has at least two apertures each defined by a flat inner wall and wherein two of the bolts are used to attach each end to an adjacent side member.

7. The conveyor frame in accordance with claim 5 wherein the shaft has a threaded portion and the fastener is a nut threaded onto the shaft.

8. The conveyor frame according to claim 5 wherein the hook portion of the bolt extends at an acute angle to the shaft.

* * * * *